United States Patent [19]

Fukuda

[11] Patent Number: 4,529,049
[45] Date of Patent: Jul. 16, 1985

[54] COMBINATORIAL WEIGHING OR COUNTING METHOD

[75] Inventor: Masao Fukuda, Kouga, Japan

[73] Assignee: Kabushiki Kaisha Ishida Koki Seisakusho, Kyoto, Japan

[21] Appl. No.: 428,291

[22] Filed: Sep. 29, 1982

[30] Foreign Application Priority Data

Sep. 30, 1981 [JP] Japan .............................. 56-156427

[51] Int. Cl.³ ........................................... G01G 19/22
[52] U.S. Cl. ........................................ 177/1; 177/25
[58] Field of Search ...................................... 177/1, 25

[56] References Cited

U.S. PATENT DOCUMENTS

| 4,313,507 | 2/1982 | Hays ........................................ 177/1 |
| 4,341,274 | 7/1982 | Hirano et al. ..................... 177/50 X |
| 4,388,975 | 6/1983 | Hirano ................................. 177/25 |

FOREIGN PATENT DOCUMENTS

| 3121454 | 5/1981 | Fed. Rep. of Germany . |
| 2473705 | 7/1981 | France . |
| 2074329 | 10/1981 | United Kingdom . |

Primary Examiner—George H. Miller, Jr.
Attorney, Agent, or Firm—Staas & Halsey

[57] ABSTRACT

A combinatorial weighing or counting method of the type in which weight data items from a plurality of weighing machines are combined to find an optimum combination giving a total combined value equal or closest to a target value within preset allowable limits, and the weighed articles are discharged from the weighing machines constituting the optimum combination. Apparatus for practicing the method includes a first storage device provided individually for each of the weighing machines. The method includes the steps of clearing the status of the first storage device corresponding to those weighing machines that participate in the optimum combination and updating by a predetermined quantity the status of the first storage device corresponding to those weighing machines that do not participate in the optimum combination. The clearing and updating are carried out each time an optimum combination is found, and it is discriminated whether the status of each of the first storage devices exceeds a preset value. Then, from combinations including at least one weighing machine corresponding to whichever of the first storage devices has a status which exceeds the preset value, a combination is selected which has a total combined value closest to the target value within the preset allowable limits. Finally, the weighed articles are discharged from the weighing machines participating in the combination.

8 Claims, 4 Drawing Figures

COMBINATORIAL WEIGHING OR COUNTING METHOD

CROSS REFERENCE TO RELATED APPLICATION

This application is related to U.S. application Ser. No. 459,940 filed Jan. 21, 1983 and assigned to the assignee of the subject application.

BACKGROUND OF THE INVENTION

This invention relates to a combinatorial weighing or counting method in a combinatorial weighing or counting apparatus having a plurality of weighing machines. More particularly, the invention relates to a combinatorial weighing or counting method in an apparatus of the type which discharges weighed articles from selected weighing machines corresponding to respective bits of a combination bit pattern obtained as a result of a combination computing operation, which method assures that certain weighing machines will not remain unselected over an extended period of time, thereby eliminating extended residence of the articles within those weighing machines.

In the prior art, a combinatorial weighing or counting apparatus is available for accurately weighing out and dispensing weighed articles of a preset target weight or preset target number. Such apparatus is equipped with a plurality of weighing machines, typically ten in number, for independently weighing articles supplied to them. Thus, as a result of the independent weighing operations, a plurality of weight values are obtained. The apparatus operates by forming all possible combinations of these weight values, adding the weight values in each combination to provide a multiplicity of sums, selecting the sum which is equal to a target value or closest to the target value within preset allowable limits, and discharging the articles from the weighing machines belonging to the combination that gave the selected sum.

In actually using an apparatus of the above-described type, there are instances where certain weighing machines are not selected, and hence are not permitted to discharge their articles, even over an extended period of time. Theoretically, if we assume that half of the weighing machines are selected each time, then the probability of a weighing machine being selected each time should be 50% (one out of two). Accordingly, the probability of a weighing machine not being chosen in, say, five consecutive selection cycles is 3.125% (one out of 32), so that we would expect a given weighing machine to be chosen within the five consecutive cycles. In actuality, however, we find that, depending upon the weight of the articles delivered to the weighing machines, a given weighing machine or machines may not be selected over a great many cycles, which can reach a figure of as high as 20 or more. When a weighing machine is not selected for a prolonged period of time, certain problems arise as will now be described.

One problem is that the weight sensor constituting a weighing machine experiences a variation in zero point with time owing to such factors as temperature change and drift. Ordinarily, the weight sensor is subjected to a zero adjustment with each discharge of articles or every predetermined number of discharge cycles, whereby the variation in zero point is corrected for. When a weighing machine is not selected, however, no correction is effected. If the weighing machine goes unselected for a prolonged period of time, therefore, the weighing error resulting from the change in zero point will grow large in magnitude.

Another problem is that the longer articles reside in the weighing hopper constituting a weighing machine, the more likely the articles are to attach themselves to the walls of the hopper. When such a condition occurs, not all of the articles are discharged from the weighing hopper so that the weight of the articles discharged obviously will be less than the measured weight. When the articles contain oil, grease or a similar fatty substance, moreover, the tendency for the articles to cling to the walls of the weighing hoppers becomes quite pronounced, especially when the fatty substance comes to the surface of the articles.

A third problem involves the weighing of frozen foods. Prolonged residence in a weighing machine will allow the surface ice on such articles to thaw, whereby the articles are likely to both spoil and become affixed to the walls of the weighing hopper.

A fourth problem arises in a case where the weighing machines are supplied with the articles by means of radiating troughs corresponding to respective ones of the weighing machines. Specifically, when the supply of articles from a trough to a corresponding weighing machine is suspended continuously, the articles in the trough gradually increase in quantity due to the action of the other troughs, until some of the articles begin falling from the trough onto a pool hopper, thereby temporarily upsetting the balanced feed of the articles.

A fifth problem involves the question of accuracy. The fact that a certain weighing machine is not selected over an extended period of time indicates that the weighing machine has not been supplied with the proper amount of articles and therefore is not actually participating in the combinatorial weighing operation. This diminishes the effectiveness of the combinatorial weighing operation and, hence, invites a decline in weighing accuracy.

SUMMARY OF THE INVENTION

Accordingly, an object of the present invention is to provide a combinatorial weighing or counting method in a combinatorial weighing or counting apparatus, which method assures that certain weighing machines will not remain unselected over an extended period of time, thereby eliminating extended residence of the articles within those weighing machines.

Another object of the present invention is to provide a combinatorial weighing or counting method wherein each of a plurality of weighing machines is selected at least once within a fixed time frame to assure that the articles will be discharged within the time frame, thereby allowing the weight sensors associated with the weighing machines to be subjected to a zero point adjustment at regular intervals, the end result being a very accurate weighing operation.

A further object of the present invention is to provide a combinatorial weighing or counting method capable of minimizing the attachment of articles to the weighing machines and of preventing spoiling of the articles due to prolonged residence within the weighing machines.

According to the present invention, these and other objects are attained by providing improvements in a combinatorial weighing or counting method of the type in which weight data items from a plurality of weighing machines are combined to find an optimum combination giving a total combined value equal or closest to a target value within preset allowable limits, and the weighed articles are discharged from the weighing machines constituting the optimum combination. To practice the method of the invention, a counter or other storage means is provided for each one of the weighing machines. According to the invention, each time an optimum combination is found, the status of the counters corresponding to those weighing machines that participate in the optimum combination are cleared to zero, whereas the status of those weighing machines that do not participate in the optimum combination are updated by a predetermined quantity of, say, one count. The next step is to discriminate whether the status of each of the counters exceeds a preset value. This is followed by selecting, from combinations including at least one weighing machine corresponding to whichever of the colunters has a status which exceeds the preset value, a combination having a total combined value which is closest to the target value within the preset allowable limits, and discharging the weighed articles from the weighing machines participating in the combination.

Other features and advantages of the invention will be apparent from the following description taken in connection with the accompanying drawings, in which like reference characters designate similar or corresponding parts throughout the several views thereof.

DESCRIPTION OF THE PREFERRED EMBODIMENT

Figure 1:
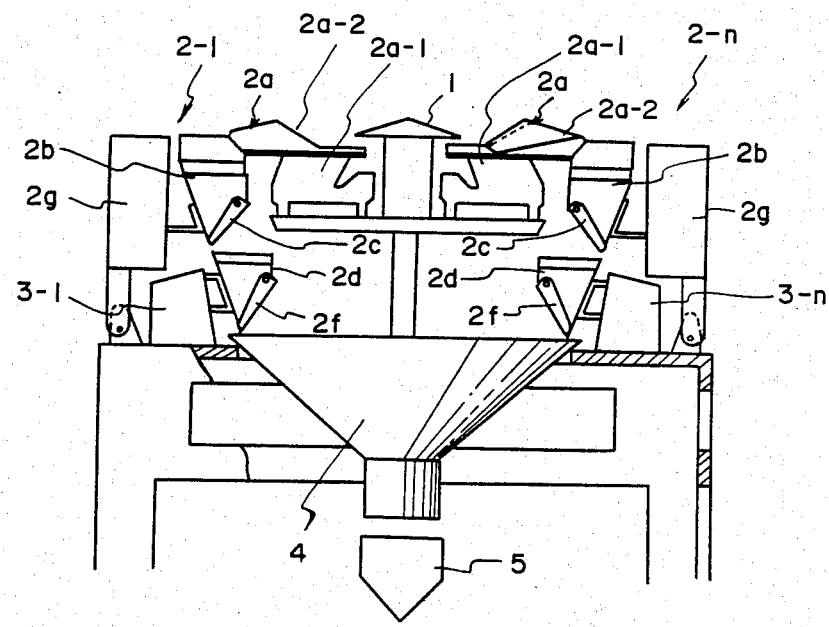
FIG. 1 is a schematic diagram of the overall construction of a conventional combinatorial weighing appartus.

FIG. 1 illustrates the general construction of a combinatorial weighing apparatus. Numeral 1 denotes a dispersing table of vibratory conveyance type. Articles to be weighed are introduced onto the dispersing table 1 and imparted with vibratory motion for a predetermined length of time so as to be dispersed radially outward from the center of the table. Numerals 2-1, . . . 2-n denote n-number of weighing stations which are arranged around the dispersing table 1 along radially extending lines to receive the articles dispersed by the table. Each weighing station includes a dispersing feeder 2a, a pool hopper 2b, a pool hopper gate 2c, a weighing hopper 2d, a weight sensor 3-i (i=1,2 . . . ,n), a weighing hopper gate 2f, and a hopper drive unit 2g. Each weight sensor and weighing hopper constitute a weighing machine. The dispersing feeder 2a is an independently vibratable conveyance device for feeding the articles by means of vibration, and includes an electromagnetic vibrator 2a-1 and a trough 2a-2 which is vibrated by the vibrator 2a-1. Each dispersing feeder 2a is so arranged that the articles received from the centrally located dispersing table 1 can be introduced into the corresponding pool hopper 2b disposed therebelow. The pool hopper gate 2c is provided on each pool hopper 2b in such a manner that the articles received in the pool hopper 2b are released into the corresponding weighing hopper 2d when the pool hopper gate 2c is opened under the control of the corresponding hopper drive unit 2g. Each of the weight sensors 3-1, . . . , 3-n, accompanying a respective one of the weighing hoppers 2d, is operable to measure the weight of the articles introduced into the corresponding weighing hopper, and to apply an electrical signal indicative of the measured weight to a combination control unit, shown in FIG. 2. The combination control unit then selects the combination of articles (referred to hereinafter as the "optimum" combination) that gives a total weight closest to a target value, as will be described below in further detail. Each weighing hopper 2d is provided with its own weighing hopper gate 2f. Only the weighing hopper gates 2f of those weighing hoppers that give the best combination are opened under the control of the hopper drive units 2g, these gates 2f discharging the articles into a common chute 4 where they are collected together. The collecting chute 4 has the shape of a funnel and is so arranged as to receive the articles from any of the circularly arrayed weighing hoppers 2d via the hopper gates 2f, which are located above the funnel substantially along its outer rim. The articles received by the collecting chute 4 are collected at the centrally located lower end thereof by falling under their own weight or by being forcibly shifted along the inclined wall of the funnel by a mechanical scraper or the like, which is not shown.

Figure 2:
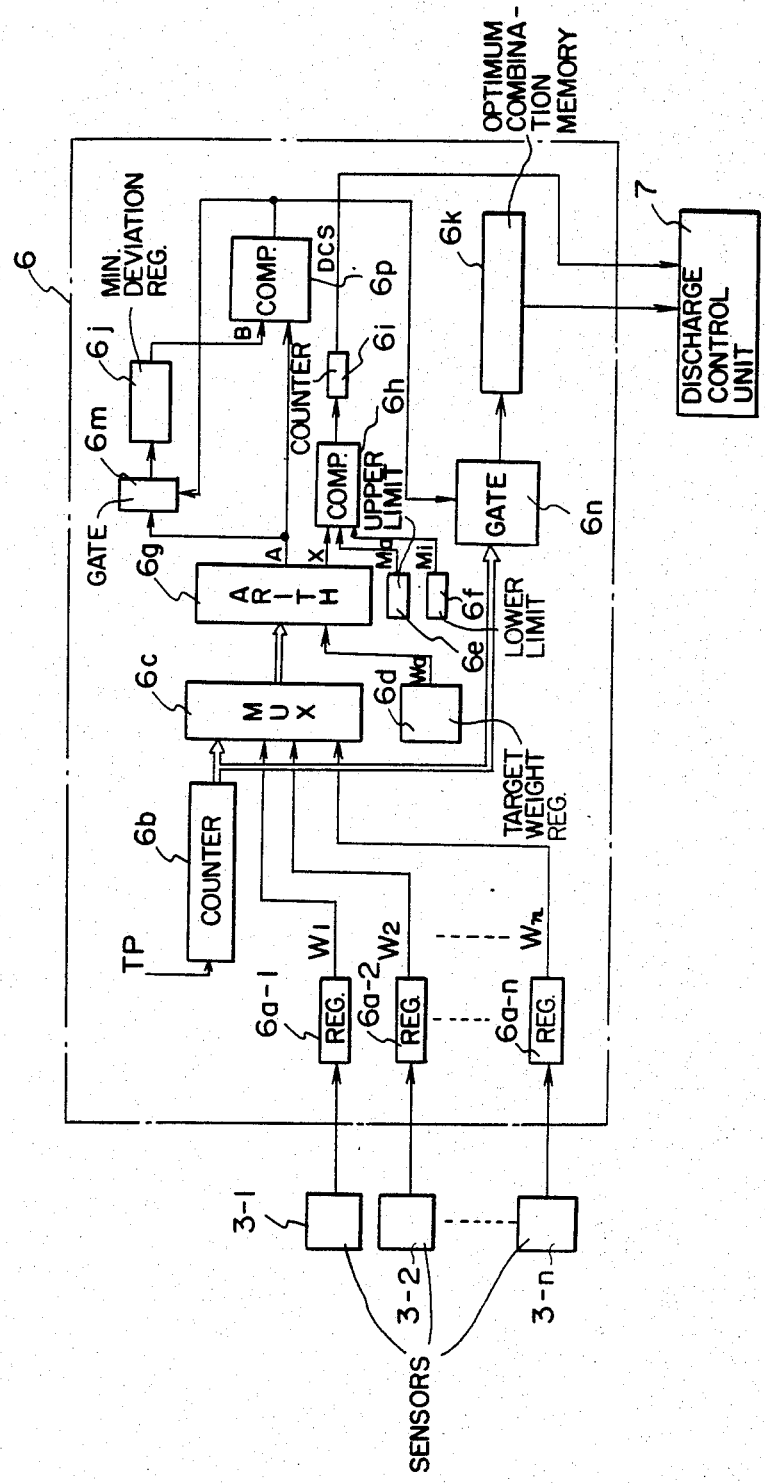
FIG. 2 is a block diagram of a conventional combination control unit.

In operation, articles are charged into each of the pool hoppers 2b and weighing hoppers 2d. The weighing sensors 3-1, . . . ,3-n associated with the weighing hoppers 2d measure the weights of the articles and supply the combination control unit, the details of which are shown in FIG. 2, with signals indicative of the measured weight values, denoted $W_1$ through $W_n$. The combination control unit computes combinations based on the weight values $W_1$ through $W_n$ and selects the optimum combination of articles that gives a total weight closest to a target weight within preset allowable limits. The hopper drive units 2g respond by opening the prescribed weighing hopper gates 2f based on the optimum combination, whereby the articles giving the combination are released into the collecting chute 4 from the corresponding weighing hoppers 2d to be fed into the timing hopper 5. This will leave the selected weighing hoppers 2d empty. Subsequently, therefore, the pool hopper gates 2c corresponding to the empty weighing hoppers 2d are opened to introduce a fresh supply of the articles from the respective pool hoppers 2b into the weighing hoppers 2d, leaving these pool hoppers 2b empty. Accordingly, the dispersing feeders 2a which correspond to the empty pool hoppers 2b are vibrated for a predetermined period of time to deliver a fresh supply of the articles to these pool hoppers. This restores the weighing apparatus to the initial state to permit resumption of the control operation for selecting the best weight combinations in the manner described. Thus, weighing by the combinatorial weighing apparatus may proceed in continuous fashion by repeating the foregoing steps.

Reference will now be had to the block diagram of FIG. 2 for a fuller description of the construction and operation of the combination control unit. The combination control unit, designated at numeral 6, includes registers 6a-1, 6a-2, . . . , 6a-n for storing weight values W1, W2, . . . Wn delivered by the respecitve weight sensors 3-1, 3-2, . . . 3-n, and an n-bit counter 6b for counting timing pulses TP of a predetermined frequency, and for generating combinations of the n-number of weighing machines. These combinations will also be referred to as "combination patterns" where appropriate. Specifically, for n-number of weighing hoppers, n combinations are possible when each combination is composed of one weighing hopper from the total of n weighing hoppers, n(n−1)/2! combinations are possible when each combination is composed of two weighing hoppers selected from said total, and, in general, n(n−1)(n−2) . . . (n−r+1)/r! combinations are possible when each combination is composed of r-number of weighing hoppers selected from said total of n weighing hoppers. Accordingly, when the n-bit binary counter 6b has counted $2^n - 1$ timing pulses TP, a total of $2^n - 1$ different bit patterns, from 000 . . . 001 to 111 . . . 111, will have been generated. Therefore, if a correlation is established between the first bit and the first weight sensor 3-1, between the second bit and the second weight sensor 3-2, and between third through n-th bits and the third through n-th weight sensors 3-3 through 3-n, respectively, then the generated bit pattern will be an indication of the above-mentioned combination pattern.

The generated bit pattern, indicative of the value of the count in counter 6b, is applied to a multiplexer 6c. The latter provides an arithmetic unit 6g with the weight values stored in those registers 6a-1, 6a-2, . . . 6a-n, for the corresponding weight sensors, specified by the bit pattern. For instance, if the value of the count is 1000101011 when n=10, then the arithmetic circuit 6g will receive the weight value outputs W1, W2, W4, W6, W10 from the first, second, fourth, sixth and tenth weight sensors 3-1, 3-2, 3-4, 3-6 and 3-10, respectively. The arithmetic unit 6g also receives a signal $W_a$, indicative of a target value, from a target weight register 6d which stores the target weight. Numerals 6e and 6f denote upper and lower limit setting devices, respectively, for storing preset allowable limits (namely an upper limit or maximum value $M_a$, and a lower limit or minimum value $M_i$, respectively) for weight values. The minimum value $M_i$ is set equal to the target value, as is customary. If it were set lower than the target value, the result could be delivery of articles having a total weight less than that intended, and complaints might ensue.

The arithmetic unit 6g computes, and delivers a signal indicative of, the gross weight $\Sigma W_i (=X)$ of the weight values received from the multiplexer, and also computes the difference between the gross weight $\Sigma W_i$ and the target value $W_a$. The arithmetic unit 6g produces a signal A indicating the absolute value of the computed difference. More specifically, the arithmetic unit 6g performs the operations:

$$\Sigma W_i = X \quad (1)$$

$$|\Sigma W_i - W_a| = A \quad (2)$$

and produces a signal representing the total weight $\Sigma W_i (=X)$, as well as a signal A representing the absolute value (hereafter referred to simply as the "deviation") of the difference between the gross weight $\Sigma W_i$ and the set target weight $W_a$. The value X is applied to a comparator 6h, whose output is connected to a counter 6i. The comparator 6h discriminates whether the total weight X lies in the range defined by $M_i$ and $M_a$. Specifically, if the following relation holds:

$$M_i \leq X \leq M_a \quad (3)$$

then the comparator 6h will increment (count up) the counter 6i by one. A minimum deviation register 6j for storing the minimum deviation is set automatically to the deviation A the first time only, and thereafter is updated as the conditions warrant, as will be described later. In the case where the minimum value $M_i$ is set equal to the target weight value, it is permissible to initially set the minimum deviation register 6j to the difference between the maximum value $M_a$ and the target value. An optimum combination memory 6k is adapted to store the optimum combination pattern. Numeral 6m and 6n denote gates. When the total weight $\Sigma W_i$ is within the preset allowable limits, a comparator 6p compares the deviation value A, namely the output of the arithmetic unit 6g, with the minimum deviation value, denoted by B, stored in the minimum deviation register 6j. When the inequality A<B holds, the output of comparator 6p is such that the deviation value A is delivered for storage to the minimum deviation register 6j through the gate 6m, and the content (combination pattern) of counter 6b is delivered for storage to the best combination memory 6a.

Numeral 7 denotes a discharge control unit. When the content of counter 6h is one or more, the discharge control unit 7, which receives a signal from memory 6k indicative of the optimum combination pattern, is operable to open the weighing hopper gates 2f (FIG. 1) specified by the optimum combination pattern, so that the corresponding weighing hoppers discharge their articles into the collecting chute 4, and to open the corresponding pool hopper gates so that the emptied weighing hoppers may be replenished with articles.

The operation of the combination control unit 6 will now be described in brief. At the beginning, each of the weighing hoppers 2d contain a supply of the articles. The weight sensors 3-1, 3-2, . . . 3-n measure the weights of the articles and produce the weight values W1 through W10 which are sent to the combination control unit 6 for storage in the registers 6a-1, 6a-2 . . . 6a-n, respectively. The n-bit (n=10) counter 6b counts the timing pulses TP having the predetermined frequency to produce $2_n - 1$ combination patterns. Thus, when the first timing pulse TP arrives and is counted, the content of counter 6b becomes 0000000001. As a result, the multiplexer 6c sends the first weight value signal W1, from the first weight sensor 3-1 and stored in the register 6a-1, to the arithmetic circuit 6g, which responds by performing the operations specified by equations (1) and (2) above, thereby producing the signals indicative of the gross weight $\Sigma W_i$ of the combination and of the deviation A $(=|W1-W_a|)$ between $\Sigma W_i$ and the set target value $W_a$. Since the gates 6m, 6n are open for the initial combinatorial computation, the deviation value A is transferred to and stored in the minimum deviation register 6j, and the content (the combination pattern 0000000001) of n-bit counter 6b is stored in the best combination memory 6k. Comparator 6h compares the gross weight $\Sigma W_i (=X)$ against the maximum value $M_a$ and the minimum value $M_i$, and increments the counter 6i when the relation $M_i \leq X \leq M_a$ holds. Thenceforth, when the second timing pulse TP is generated, the pulse is counted by counter 6b, whose content (combination pattern) is incremented to 0000000010. Consequently, the weight value output W2 of the weight sensor 3-2 provided on the second weighing hopper, which weight value is stored in the register 6a-2, is delivered to the arithmetic unit 6g which then performs the operations of equations (1) and (2) to produce the signals indicative of the total weight $\Sigma W_i (=X)$ and of the deviation value A $(=|W2-W_a|)$. The comparator 6h then determines whether equation (3) is satisfied; if it is, then the content of counter 6i is incremented by one. The comparator 6p, meanwhile, compares the deviation value A with the content B $(=|W1-W_a|)$ of the minimum deviation register 6j. If the relation $A \geq B$ holds, then neither the register 6j nor the best combination memory 6k is updated; if $A < B$ holds, the deviation value A is transferred to and stored in register 6j, and the content of counter 6b is transferred to and stored in memory 6k. The operation described above is repeated until all $2^n - 1$ combinations have been generated. At such time the content of the minimum deviation register 6j will be the minimum deviation value obtained from the $2^n - 1$ combinations, and the content of the optimum combination memory 6k will be the combination pattern that gave the minimum value. The optimum combination is thus selected from the total of $2^n - 1$ possible combination patterns. Thenceforth, when the value of the count in counter 6i is one or more, the output of the counter 6i, namely a discharge start signal DCS (now logical "1"), and the combination pattern stored in the optimum combination memory 6k, are applied to the discharge control unit 7. When the value of the count in counter 6i is one or more, the discharge control unit 7 successively opens the hopper gates 2f (FIG. 1) of those weighing hoppers corresponding to the "1" bits of the input combination pattern, whereby the articles in these weighing hoppers are discharged into the collecting chute 4, after which the discharge control unit 6 opens the corresponding pool hopper gates 2c to replenish the emptied weighing hoppers with articles. Further, the dispersing feeders corresponding to the now-empty pool hoppers are vibrated for a fixed length of time to resupply these pool hoppers with articles. This completes one combinatorial weighing cycle, which may be repeated as often as required, to provide batches of the articles, each batch having a total weight equal or closest to the set target weight. It should be noted that when the content of counter 6i is zero in the foregoing operation, articles are not discharged and each of the weighing machines must be supplemented with articles to resume the combinatorial computations.

Figure 3:
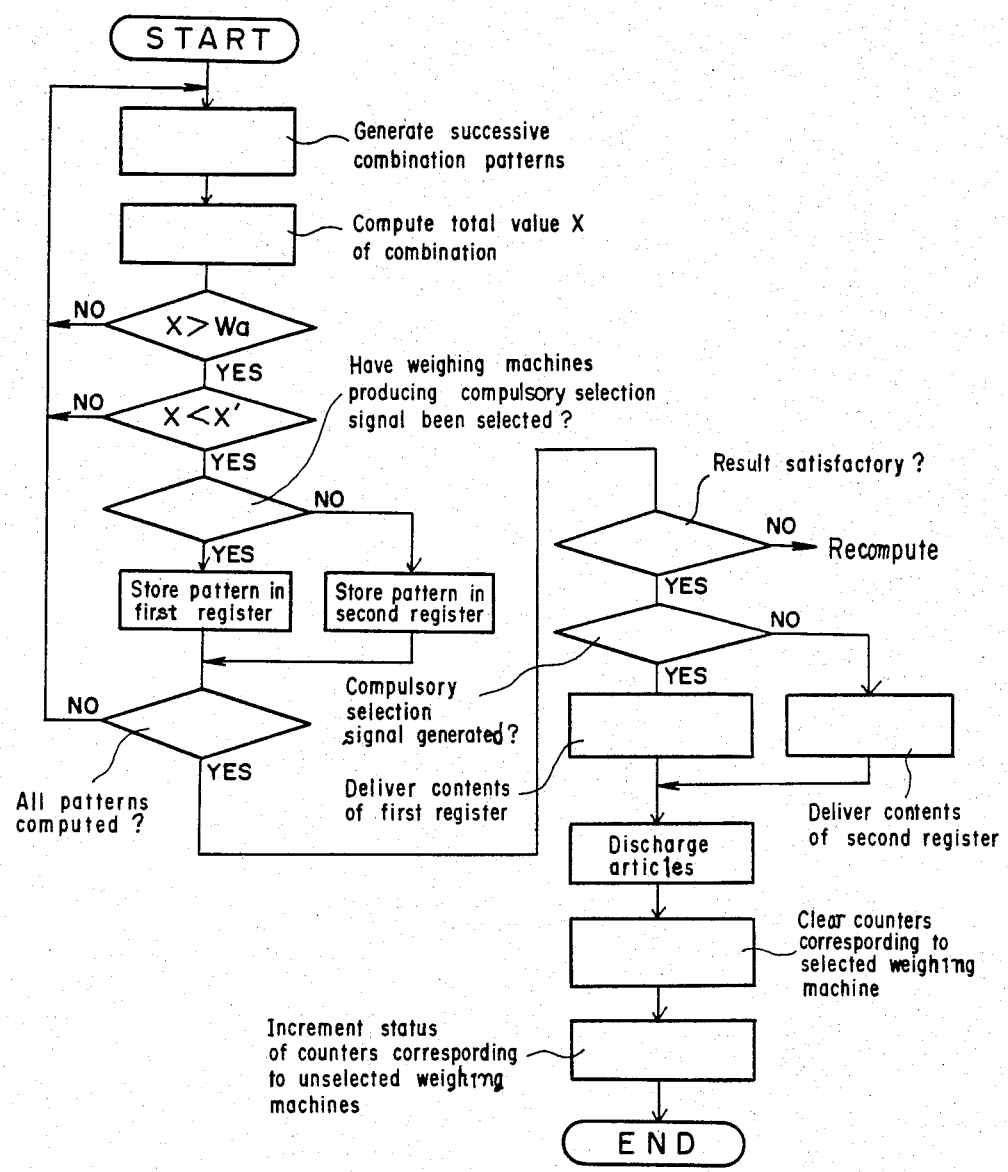
FIG. 3 is a flowchart useful in describing the general features of the present invention.

The present invention will now be described with reference to the flowchart of FIG. 3 showing the processing steps according to the combinatorial weighing method of the invention.

After each of the weighing machines has completed measuring the weights of the articles contained in the corresponding weighing hoppers to provide a plurality of weight values, a computation start signal is applied, in response to which the first combination pattern is generated in the manner described in conjunction with FIG. 2. This is followed by computing the total weight X of the weight values supplied by the weighing machines designated by the combination pattern. The next step is to discriminate whether the total weight X obtained is greater than the target weight Wa. When it is not, operation shifts back to the initial step where the next combination pattern is generated, followed by the process steps just described. When the total weight X is greater than the target weight Wa, the next step is to discriminate whether X is less than the total weight X' of the immediately preceding combination. The decision in this block will be "Yes" unconditionally the first time a decision is required to be made. When the decision rendered during processing is "No", operation shifts back to the first block for a repeat of the process steps thus far described. When the decision is "Yes", namely when $X < X'$, the next process step is to discriminate whether certain weighing machines have requested to be selected compulsorily and, if so, whether at least one of these weighing machines requesting selection has been selected by the currently prevailing combination pattern. The determination as to whether a weighing machine has requested to be selected compulsorily depends upon whether a compulsory selection signal has been produced. Although the means for generating the compulsory selection signal will be described later in greater detail, suffice it to say for the time being that the signal is generated when a weighing machine(s) has not discharged its articles after a predetermined number of discharge cycles. If the decision in this block is "Yes", that is, when at least one of the weighing machines that has caused a compulsory selection signal to be produced has been selected, then the combination pattern prevailing at such time is stored in a first register, described below. When the decision is "No", the currently prevailing combination pattern is stored in a second register, also to be described later.

The next step is to decide whether processing for all possible combination patterns has been completed; if it has not, then operation shifts back to the beginning and the foregoing steps are repeated until a "Yes" decision is obtained. When it has, this means that the combination pattern stored in either the first or second register will give a total weight closest to the target weight Wa. More specifically, if none of the weighing machines have caused a compulsory selection signal to be generated, then, from among all possible combinations, that combination which is left stored in the second register will be the one that gives a total weight closest to the target weight Wa. On the other hand, if at least one of the weighing machines has caused a compulsory selection signal to be generated, then, from among combinations which include at least the one weighing machine, that combination left stored in the first register will be the one that gives a total weight closest to the target weight Wa and, from among combinations which do not include weighing machines that have caused compulsory selection signals to be generated, that combination left stored in the second register will be the one that gives a total weight closest to the target weight Wa.

The next step is to discriminate whether the total weight of the articles provided by the stored combination pattern is the desired weight, that is, whether the total weight falls within the preset allowable limits. If the decision is "No", a recomputation operation is initiated. Although not described here in detail, in general the operation includes reintroducing articles into a plurality of the weighing machines and then repeating the calculations by returning to the START block at the beginning of the flow chart of FIG. 3. When the decision as to whether the total weight is satisfactory is "Yes", the next step is to discriminate again whether at least one of the weighing machines has requested to be selected compulsorily. When the decision is "Yes", the combination pattern stored in the first register is delivered as an output and, when "No", the combination stored in the second register is delivered as an output. Thenceforth the articles are discharged from the weighing machines selected by the delivered combination pattern, whether from the first or second register. This is followed by clearing counters corresponding to those weighing machines that have discharged their articles upon being selected. The final step to complete the processing for this one combinatorial computation cycle is to increment the counters corresponding to the unselected weighing machines.

Figure 4:
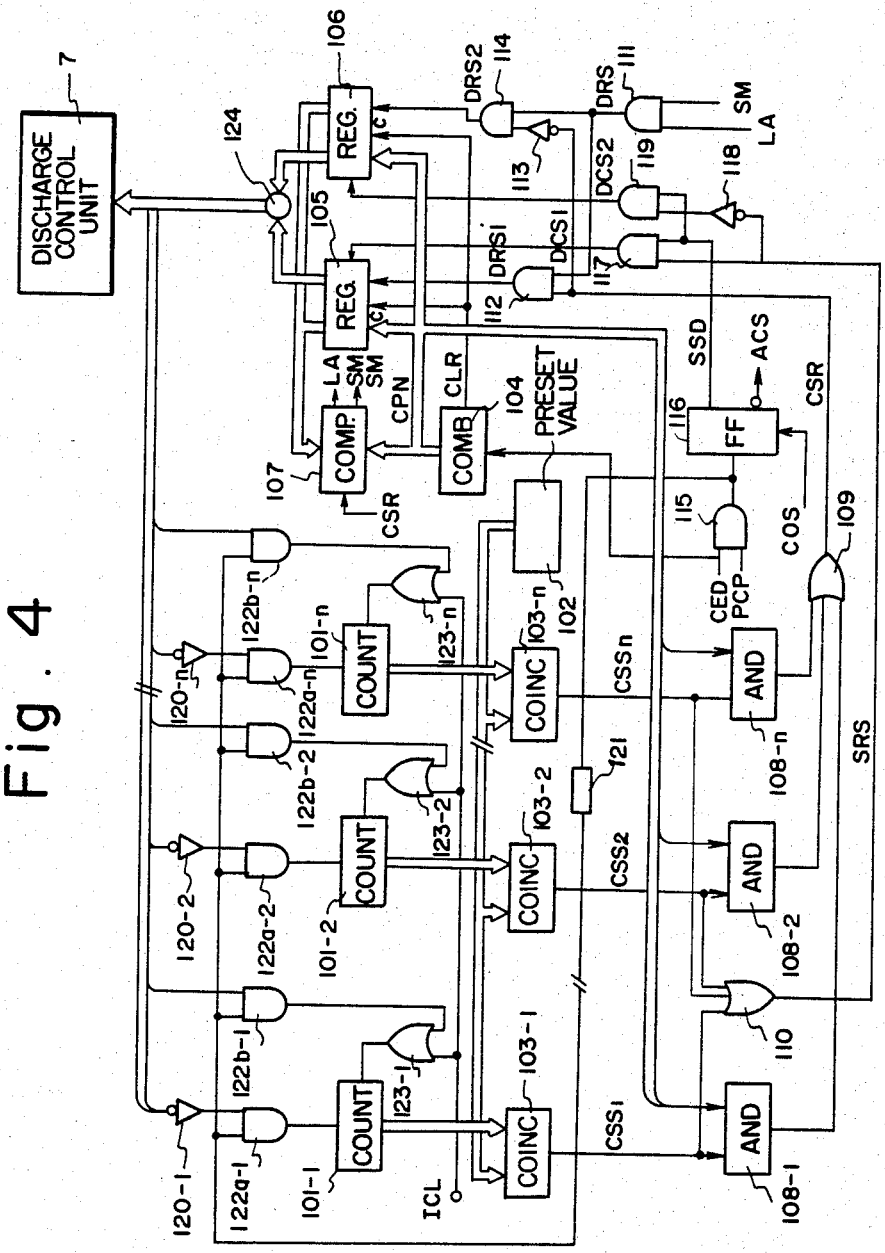
FIG. 4 is a block diagram of an apparatus for practicing the method of the present invention.

Reference will now be had to FIG. 4 to describe an apparatus for realizing the method of the present invention. The apparatus includes counters 101-1, 101-2, ... , 101-n corresponding to respective ones of the weighing machines. For each weighing and discharge cycle of operation, counters corresponding to the weighing machines that discharge their articles are cleared, whereas those corresponding to weighing machines that do not discharge their articles are incremented by one count. Numeral 102 denotes a preset value setting unit for presetting a numerical value N. It should be noted that a compulsory selection signal is produced when a weighing machine has not been selected N consecutive times or more. To this end, there are provided coincidence circuits 103-1, 103-2, ... ,103-n for producing compulsory selection signals $CSS_1$, $CSS_2$, ... ,$CSS_n$ corresponding to the respective weighing machines. Specifically, one of the coincidence circuits will produce a compulsory selection signal for a corresponding weighing machine when the value of the count in a corresponding one of the counters 101-1, 101-2, ... ,101-n exceeds the output value N of the preset value setting unit 102. A combination pattern generating circuit 104 successively generates patterns of weighing machine combinations. These combination patterns are applied to a first register 105, a second register 106 and a data comparator 107.

If none of the weighing machines have caused a compulsory selection signal to be generated, then, from among all possible combinations, that combination which is left stored in the second register 106 will be the one that gives a total weight closest to the target weight. On the other hand, if at least one of the weighing machines has caused a compulsory selection signal to be generated, then, from among combinations which include at least the one weighing machine, that combination left stored in the first register 105 will be the one that gives a total weight closest to the target weight; and from among combinations which do not include weighing machines that have caused compulsory selection signals to be generated, that combination left stored in the second register 106 will be the one that gives a total weight closest to the target weight.

The data comparator 107 discriminates whether the total weight specified by a combination pattern generated by the combination pattern generating circuit 104 is larger than the target weight and, when it is, produces a high-level signal (logical "1") LA. The data comparator 107 also discriminates whether the currently prevailing total weight is smaller than the last total weight provided by the combination pattern presently stored in the first register 105 or second register 106. When the current weight is smaller, the comparator 107 produces a high-level signal (logical "1") SM. Whether the currently prevailing total weight is compared with the total weight based on the combination pattern in the first register 105 or second register 106 depends on an output signal CSR from an OR gate 109, which will be described below.

AND gates 108-1, 108-2, ... ,108-n are provided for taking the AND between the compulsory selection signals $CSS_1$, $CSS_2$, ... ,$CSS_n$ from the coincidence circuits 103-1, 103-2, ... 103-n, and the bits in each combination pattern received from the pattern generating circuit 104. An OR gate 109 takes the OR of the output signals from the AND gates 108-1, 108-2, ... , 108-n, and produces the above-mentioned signal CSR (logical"1") when at least one weighing machine which has requested compulsory selection coincides with the logic of the corresponding bit in the currently prevailing combination pattern. An OR gate 110 takes the OR of the compulsory selection signals $CSS_1$, $CSS_2$, ... $CSS_n$ produced by the coincidence circuits 103-1, 103-2, ... , 103-n, and produces a compulsory selection request signal SRS (logical "1") when at least one weighing machine has requested compulsory selection. An AND gate 111 produces a data rewrite signal DRS, for rewriting the data in the first register 105 or second register 106 when two conditions hold simultaneously, namely when the total weight provided by the currently prevailing combination pattern is (1) smaller than the total weight provided by the last combination pattern (signal SM from the comparator 107 is logical "1"), and (2) larger than the target weight (signal LA from the comparator 107 is logical "1"). An AND gate 112 produces a data rewrite signal $DRS_1$ for rewriting the data in the first register 105 when the signal CSR from the OR gate 109 and the data rewrite signal DRS from the AND gate 111 are logical"1" simultaneously. A NOT gate 113, whose input is the signal CSR from the OR gate 109, has its output connected to an AND gate 114 which, with the output signal CSR from OR gate 109 at logical "0", produces a data rewrite signal $DRS_2$ for rewriting the data in the second register 106 when the AND gate 111 produces the data rewrite signal DRS. An AND gate 115 takes the AND between a computation end signal CED which is generated when processing for all possible combinations has been completed, and a signal PCP which is produced when the result of the combinatorial processing is within the preset allowable limits. A flip-flop 116 is cleared by a combination computation start signal COS, and set by the leading edge of the output from AND gate 115. The flip-flop 116 produces from its set output terminal a signal SSD which indicates that a combination whose total weight resides within the preset allowable limits has been obtained, and produces from its reset output terminal a recomputation signal ACS instructive of the fact that combinatorial processing is to be re-executed. An AND gate 117 produces a discharge command signal $DCS_1$ when the flip-flop 116 is set at such time that the compulsory selection request signal SRS from OR gate 110 is logical "1". When the discharge command signal $DCS_1$ (logical "1") is produced, the combination pattern stored in the first register 105 is delivered to the discharge control unit 7 through a mixing circuit 124. A NOT gate 118, whose input is the compulsory selection request signal SRS, has its output connected to the input side of an AND gate 119 which produces a discharge command signal $DCS_2$ when the flip-flop 116 is set at such time that the signal SRS is at logical "0". When the discharge command signal $DCS_2$ (logical "1") is produced, the combination pattern stored in the second register 106 is delivered to the discharge control unit 7 through the mixing circuit 124.

Numerals 120-1, 120-2, ... , 120-n denote NOT gates. The input to a NOT gate, for example NOT gate 120-i (where i=1, 2, ... , n), is a signal indicative of the corresponding bit, namely the i-th bit, of the combination pattern delivered by the first register 105 or second register 106. A delay circuit 121 delays the output obtained from AND gate 115 to establish the rewrite timing for the counters 101-1, 101-2, ..., 101-n. Numerals 122a-1, 122a-2, ..., 122a-n denote AND gates which, when the output of the delay circuit 121 is logical "1", deliver "1" outputs from the NOT gates 120-1, 120-2, ..., 120-n to the respective count enable terminals of the corresponding counters 101-1, 101-2, ..., 101-n, whereby the counters corresponding to those weighing machines that did not deliver their articles are incremented by one count. Numerals 122b-1, 122b-2, ..., 122b-n denote AND gates each of which will produce an output ("0" or "1") indicative of the corresponding bit in the combination pattern in the first register 105 or second register 106 when the output of the delay circuit 121 is logical "1". Numerals 123-1, 123-2, ..., 123-n denote OR gates for taking the OR between a clear signal ICL, generated by introducing electric power when combinatorial weighing starts, and the output signals from the corresponding AND gates 122b-1, 122b-2, ..., 122b-n. The output of each of these OR gates is connected to a clear terminal on respective ones of the counters 101-1, 101-2, ... 101-n.

A combinatorial weighing operation performed by the apparatus shown in FIG. 4 will now be described.

To start operation, power is introduced to the system. This results in the generation of the clear signal ICL which is applied to the clear terminal of each counter 101-1, 101-2, ... 101-n through the corresponding OR gates 123-1, 123-2, ..., 123-n, whereby the status of each counter is cleared to zero. Each weighing machine is supplied with articles to be weighed and then proceeds to perform a weighing operation. At the instant all of the weighing machines complete the weighing of their articles, the combinatorial computation start signal COS is generated, whereby flip-flop 116 is placed in the reset state and produces the recomputation signal ACS, in response to which combinatorial computation begins. The pattern generating circuit 104 delivers a clear signal CLR to the first and second registers 105, 106 to clear their status, and then generates the initial combination pattern CPN. The data comparator 107 now compares the total weight obtained from this combination pattern with the total weight provided by the combination pattern delivered by the first register 105 or second register 106, and produces the two signals LA, SM upon performing the discrimination operation described earlier. The AND gate 111 will produce the data rewrite signal DRS only when signals LA, SM are both logical "1". The arrangement is such that signal SM will be a "1" unconditionally for the first combination pattern. Therefore, if the total weight provided by the first combination pattern is greater than the preset target weight (i.e., LA="1"), then AND gate 111 will produce the data rewrite signal DRS, that is, logical "1". When such condition prevails, the data rewrite signal $DRS_1$ is produced by AND gate 112 when the signal CSR from OR gate 109 is a "1", and the data rewrite signal $DRS_2$ is produced by AND gate 114 when signal CSR is a "0". The combination pattern CPN being produced by the combination pattern generating circuit 104 is stored in the first register 105 when the data rewrite signal $DRS_1$ is produced, or in the second register 106 when the data rewrite signal $DRS_2$ is produced. Thenceforth the pattern generating circuit 104 generates the next combination pattern CPN. The data comparator 107 now compares the total weight obtained from this currently prevailing combination pattern with the target weight and with the total weight obtained from the combination pattern delivered by the first register 105 or second register 106 and, as before, produces the signals LA, SM based upon the result of the comparisons. It should be noted that the data comparator 107 compares the currently prevailing total weight with the total weight from the combination in the first register 105 when signal CSR from OR gate 109 is logical "1", and with the total weight from the combination in the second register 106 when signal CSR is logical "0". Only when the signals LA and SM are both logical "1" will the combination pattern being generated at such time be stored, this being in the first register 105 when the output signal CSR of OR gate 109 is a "1", or in the second register 106 when output signal CSR is a "0". Thus, each time the combination pattern generating circuit 104 successively generates a different combination pattern, the foregoing processing is repeated. Eventually, all possible combination patterns will be generated. When this is achieved, if none of the weighing machines have caused a compulsory selection signal to be generated, then, from among all possible combinations, that combination which is left stored in the second register 106 will be the one that gives a total weight closest to the target weight. On the other hand, if at least one of the weighing machines has caused a compulsory selection signal to be generated, then, from among combinations which include at least said one weighing machine, that combination left stored in the first register 105 will be the one that gives a total weight closest to the target weight; and from among combinations which do not include weighing machines that have caused compulsory selection signals to be generated, that combination left stored in the second register 106 will be the one that gives a total weight closest to the target weight.

Now that all combinations have been generated, the computation end signal CED enters the combination generating circuit 104 and the AND gate 115. This causes the combination generating circuit 104 to cease operating. Also, at this time the other input terminal to AND gate 115 is receiving the discrimination signal DCP which indicates whether the total weight provided by the combination pattern stored in the first register 105 or second register 106 is within the preset allowable limits. When both signals CED, DCD are logical "1", the output of AND gate 115 is logical "1". When the compulsory selection request signal SRS is logical "1", the discrimination signal DCP goes to logical "1" if the total weight obtained from the combination pattern in the first register 105 is within the preset allowable limits. When signal SRS is logical "0", however, signal DCP goes to logical "1" if the total weight obtained from the combination pattern in the second register 106 is within the preset allowable limits.

The output signal (logical "1") from AND gate 115 is applied to the delay circuit 121 and thenceforth acts as a control signal for the counters 101-1, 101-2, ..., 101-n, and is further applied to the flip-flop 116 to set the same. As a result, signal SSD goes high to open AND gates 117, 119, whereby the discharge command signal $DCS_1$ may be delivered to the first register 105 when the compulsory selection request signal SRS is logical "1", and the discharge command signal $DCS_2$ may be delivered to the second register 106 when the compulsory selection request signal SRS is logical "0". Thus, if signal SRS is logical "1" at this time, the combination pattern stored in the first register 105 is delivered to the discharge control unit 7. If signal SRS is logical "0", that is, if a compulsory selection has not been requested, then the combination pattern stored in the second register 106 is delivered to the discharge control unit 7. The latter responds by causing predetermined ones of the weighing machines to discharge their articles. The combination pattern delivered by the first or second register is also applied to the NOT gates 120-1, 120-2, . . . , 120-n and thence to the AND gates 122a-1, 122a-2, . . . , 122a-n, which are open due to application of the signal from the delay circuit 121. As a result, only those counters corresponding to the weighing machines that did not discharge their articles are incremented by one count. The combination code from the first or second register is further applied to the AND gates 122b-1, 122b-2, . . . 122b-n, these AND gates also being open due to the signal from delay circuit 121. Since the outputs of these AND gates are connected to the respective counters 101-1, 101-2, . . . , 101-n through the corresponding OR gates 123-1, 123-2, . . . , 123-n, those counters corresponding to the weighing machines that have discharged their articles are cleared to zero.

It should be noted that in a case where the discrimination signal DCP is logical "0" after the pattern generating circuit 104 has generated all possible combination patterns, flip-flop 116 is not placed in the set state, thereby prohibiting the discharge operation. Recomputation processing is executed as a result.

As described above, the counters corresponding to weighing machines that did not discharge their articles are incremented by one count as each combinatorial computation cycle is performed. If the status of the count in at least one of the counters becomes equivalent to or exceeds the preset value N established by the preset value setting unit 102, then the corresponding coincidence circuit(s) 103-1, 103-2, . . . , 103-n will produce the compulsory selection signal(s) $CSS_1$, $CSS_2$, . . . , $CSS_n$, whereby a compulsory selection operation is requested for the next combinatorial computation cycle. Accordingly, through the procedure described above, a combinatorial operation is executed, whereby those weighing machines that have initiated the request are compelled to participate in a combination in order to discharge their articles. In other words, weighing machines are assured of being selected at least once every predetermined number of combinatorial computation cycles.

It has been described above that recomputation is executed in a case where, from among the combinations that include at least one weighing machine that has caused a compulsory selection signal to be generated, there is no combination available which gives a total weight within the preset allowable limits. However, if the combination stored in the second register at such time (namely the combination which does not include a single weighing machine that has caused a compulsory selection signal to be generated) gives a total weight within the preset limits, then the articles can be discharged from the weighing machines participating in said combination. In such case, therefore, it would not be necessary to execute a recomputation.

Accordingly, as described and illustrate above, the method of the present invention finds application in a combinatorial scale which performs a weighing or counting operation by weighing batches of articles in a plurality of weighing machines, performing combinatorial computations with respect to all combination patterns made up of the plural weight values obtained thereby to find a combination pattern giving a total weight value or a total number equal or closest to a target value, and discharging articles from the weighing machines designated by the combination pattern. According to the method of the invention, weighing machines are assured of being selected at least once within a predetermined time frame to preclude any difficulties that might otherwise arise due to prolonged residence of the articles within the weighing machines. The end result is a weighing apparatus of much improved reliability.

Although a certain preferred embodiment has been shown and described in detail, it should be understood that many changes and modifications may be made therein without departing from the scope of the appended claims.

What I claim is:

1. A combinatorial weighing or counting method of the type in which weight data items from a plurality of weighing machines are combined to find an optimum combination giving a total combined value equal or closest to a target value within preset allowable limits, and in which weighed articles corresponding to the weight data items, are discharged from the weighing machines consituting the optimum combination, each of the weighing machines having first storage means, said method comprising the steps of:
   (a) clearing the status of the first storage means corresponding to those weighing machines that participate in the optimum combination;
   (b) updating, by a predetermined quantity, the status of the first storage means corresponding to those weighing machines that do not participate in the optimum combination, said clearing and updating steps being carried out each time an optimum combination is found;
   (c) discriminating whether the status of each of the first storage means exceeds a preset value;
   (d) selecting, from combination including at least one weighing machine corresponding to the first storage means having a status which exceeds the preset value, a combination the total combined value of which is closest to the target value within the preset allowable limits; and
   (e) discharging the weighed articles from the weighing machines participating in the combination selected in said step (d).

2. The method according to claim 1, wherein the first storage means is a counter and wherein said step (b) comprises updating by a predetermined quantity which is equivalent to one count.

3. The method according to claim 1, wherein the first storage means is a memory area and wherein said step (b) comprises updating by a predetermined quantity which is the numerical value one.

4. The method according to claim 1, further comprising the step of selecting, from all combinations of the weighing machines, a combination giving a total combined value closest to the target value within the preset allowable limits, when none of the first storage means is discriminated to have a status exceeding the preset value in said step (c).

5. The method according to claim 4, further comprising the steps of selecting a combination giving a total combined value closest to the target value within the preset allowable limits, which combination is from among all combinations that include at least one weighing machine corresponding to the first storage means having a status exceeding the predetermined value, and storing the combination in second storage means; and selecting a combination giving a total combined value closest to the target value within preset allowable limits, which combination is from among all combinations that do not include a single weighing machine corresponding to a first storage means having a status exceeding the predetermined value, and storing the combination in third storage means.

6. The method according to claim 5, wherein said step (e) comprises discharging articles from the weighing machines participating in a combination stored in the third storage means when the status of at least one of the first storage means exceeds the preset value, and there is no combination giving a total combined value within the preset allowable limits available among the combinations which include the weighing machine corresponding to the at least one of the first storage means.

7. A combinatorial measuring method for combining weight values corresponding to weighed batches of articles, to select an optimum combination having a total combined value equal to or closest to a target value within preset allowable limits, comprising the steps of:
   (a) storing, for each of the weighed batches of articles, status data indicating the number of optimum combinations which have been selected in which the corresponding weighed batch of articles did not participate;
   (b) clearing the stored status data corresponding to a weighed batch of articles which is selected as a part of the optimum combination;
   (c) updating, by a predetermined quantity, the stored status data corresponding to each weighed batch of articles which does not participate in the optimum combination, said clearing and updating steps being carried out each time an optimum combination is selected;
   (d) determining, for each weighed batch of articles, whether the stored status data exceeds a preset value;
   (e) selecting, in dependence upon said step (d), a combination, including at least one weighed batch of articles having corresponding stored status data which exceeds the preset value, having a total combined value which is closest to the target value within the preset allowable limits; and
   (f) discharging the weighed batches of articles participating in the combination selected in said step (e).

8. A combinatorial weighing apparatus having a plurality of weighing machines for weighing batches of articles to obtain a weight value corresponding to each batch of articles, comprising:
   a combination control unit for computing combinations based on the weight values of the batches of articles and for selecting the combination giving a total combined value equal to or closest to a target value within preset allowable limits;
   a plurality of storage means, respectively provided for the weighing machines, for providing output status values indicating the number of optimum combinations which have been selected since the corresponding weighing machines were a part of an optimum combination, each of said storage means being cleared when the corresponding weighing machine is selected by the combinatorial computation, each of said storage means having its output status value updated by a predetermined quantity when the corresponding weighing machine is not selected by the combinatorial computation;
   said combination control unit including means for comparing the ouput status of each of the storage means with a preset values and for selecting, as the optimum combination, the combination giving a total combined value closest to the target value within preset allowable limits from the combinations including at least one weighing machine corresponding to one of the storage means having an output status value which exceeds the preset value; and
   a discharge control unit for discharging the weighed batches of articles from the selected weighing machines.

* * * * *